March 7, 1967  G. EHRENBERG  3,308,312
LINEAR INDUCTION MOTOR
Filed Aug. 31, 1964  2 Sheets-Sheet 1
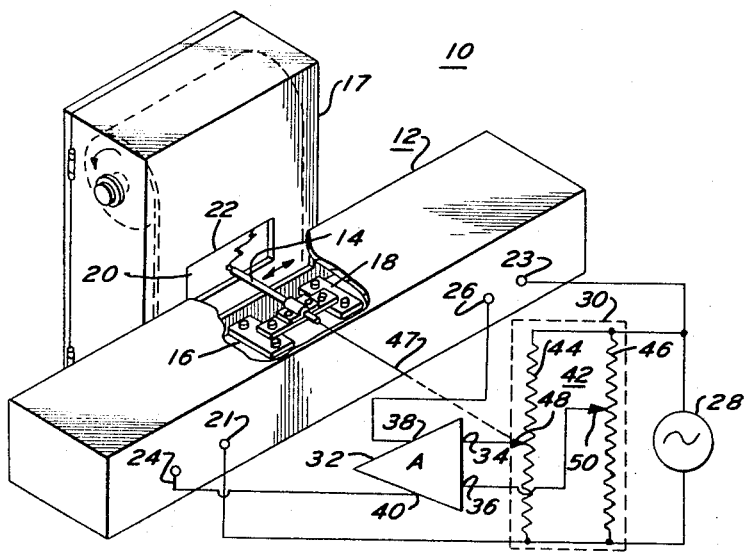
INVENTOR.
GUSTAVE EHRENBERG
BY Seidel & Gonda
ATTORNEYS.

March 7, 1967 G. EHRENBERG 3,308,312
LINEAR INDUCTION MOTOR
Filed Aug. 31, 1964 2 Sheets-Sheet 2
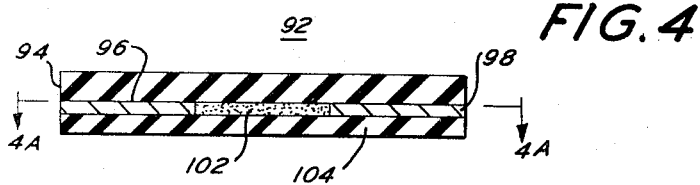
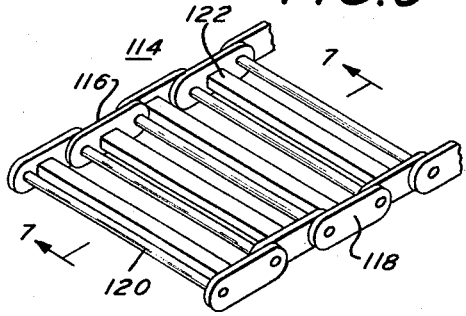
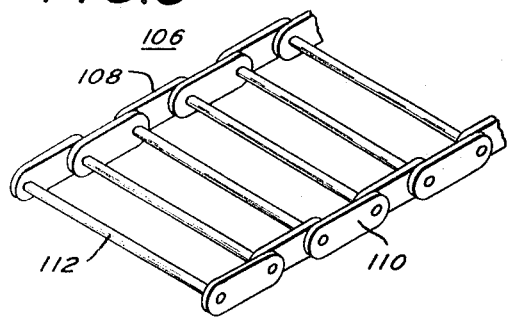
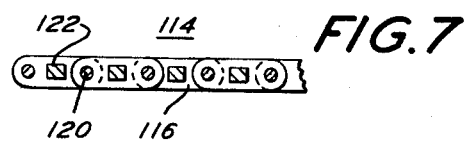
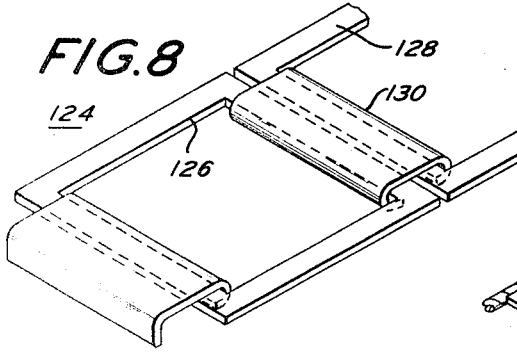
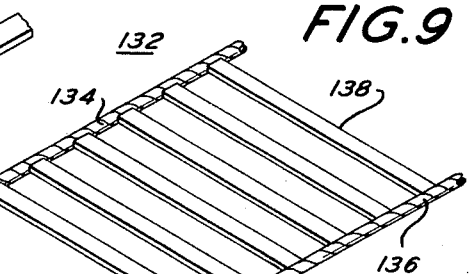
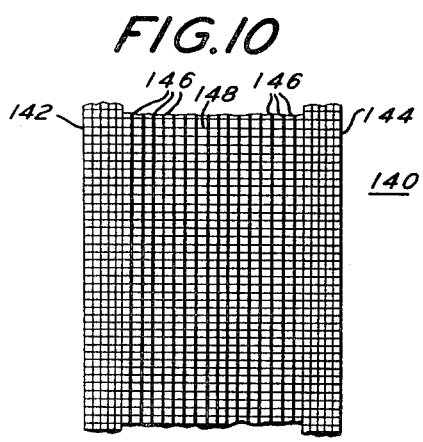
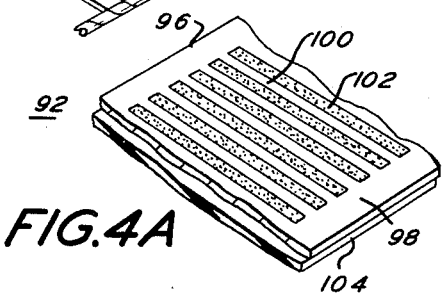
INVENTOR.
GUSTAVE EHRENBERG
BY Seidel & Gonda
ATTORNEYS.

United States Patent Office 3,308,312
Patented Mar. 7, 1967

3,308,312
LINEAR INDUCTION MOTOR
Gustave Ehrenberg, Havertown, Pa., assignor, by mesne assignments, to Electro-Nite Engineering Co., Philadelphia, Pa., a corporation of Pennsylvania
Filed Aug. 31, 1964, Ser. No. 393,085
7 Claims. (Cl. 310—13)

In general this invention relates to a new and improved linear induction motor, and more particularly to a linear induction motor having flexible armature conductors in the form of an endless belt.

A rotary induction motor depends on a rotating magnetic field that is established around the air gap of the motor. The air gap is the gap between the stator and the rotor. The rotating magnetic field is established by alternating current flowing in the stator windings. The rotating magnetic field moves around the stator windings at a uniform speed in accordance with the current variations in the windings. The speed of the rotating magnetic field is independent of load variations on the motor.

The torque of the rotary induction motor is established by the interaction of the rotating magnetic field with a magnetic field created by induced currents in the armature windings. One of the most common types of armature or rotor windings utilized is the squirrel cage construction in which rotor bars are provided, usually bare, welded or brazed to copper end rings.

A linear induction motor is one which has its stator pole pieces placed adjacent to one another along a straight line. This is a contradistinction to a rotary induction motor which has its pole pieces placed adjacent to one another along a curved surface which folds back on itself to form a circle. In place of the standard squirrel cage rotor of the rotary induction motor, a linear induction motor built in accordance with the principles of the present invention would utilize a stationary iron core to form the armature iron with a flexible conducting sheet in place of the short circuited rotor bars of the squirrel cage motor.

In a reversible linear induction motor whose stator poles are in a straight line, an armature of the same length as the stator would be entirely out of the stator field if it were to move the length of the stator. The armature would, therefore, have to be three stator lengths in order to achieve full travel in both directions. This solution has a distinct disadvantage in that it requires a motor of a length equal to three stator lengths for efficient operation. If an attempt is made to reduce the length of the armature in relation to the stator length, then only part of the stator field can act on the armature and the force on the armature is reduced.

It is the general object of this invention to provide a new and improved linear induction motor.

Another object is to provide a better induction motor having flexible armature conductors.

A further object is to provide a better induction motor for use with a recording instrument in which the inertia of the motor due to the armature iron has been eliminated.

Another object is to provide a reversible linear motor formed with an endless belt armature.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a schematic showing of the linear induction motor of the present invention utilized in a servo system.

FIGURE 2 is a front plan view of the linear induction motor of the present invention.

FIGURE 3 is a cross sectional view of the motor of FIGURE 2 taken along lines 3—3.

FIGURE 4 is a cross sectional view of one type of conductive belt which might be utilized in accordance with the principles of the present invention.

FIGURE 4a is a top plan cross sectional view of the belt of FIGURE 4 taken along lines 4—4.

FIGURE 5 is a second embodiment of the present invention in which the flexible armature is formed in the manner of a bicycle chain.

FIGURE 6 is still another embodiment of the present invention in which the bicycle chain type flexible armature has magetic cross pieces between conducting members.

FIGURE 7 is a cross sectional view of the chain armature of FIGURE 6 taken along lines 7—7.

FIGURE 8 is still another embodiment of the present invention in which the flexible armature is formed as a ladder-type chain.

FIGURE 9 is another ladder-type chain formed of flexible conducting cord side members and rigid cross members.

FIGURE 10 is a still further embodiment of the present invention in which the flexible armature is formed of a woven belt.

In FIGURE 1, there is shown a schematic diagram of a servomechanism 10 for recording a measured value. The servomechanism 10 includes the linear induction motor 12 built in accordance with the principles of the present invention. The linear motor 12 has mounted thereon a pen 14 which is moved by a flexible armature conductor 16 of the linear motor 12. The flexible armature conductor 16 is in the form of a belt joined at its ends by a connector 18 into an endless loop. The connector 18 has the pen 14 mounted thereon. A suitable permanent recorder 17 is provided having a moving sheet of paper 20 therein. The pen records the movements of the linear induction motor 12 on the sheet 20 by passing through an opening 22 in the recorder 17. It will be easily understood that any type of standard pen and recorder system might be utilized by one practicing the principles of the present invention.

The linear induction motor 12 is a two phase motor having a main stator winding connected between terminals 21 and 23 mounted on the motor casing. An auxiliary or control winding for the two phase motor 12 has its terminals 24 and 26 also mounted on the motor casing. The main winding terminals 21 and 23 are directly connected to a source 28 of alternating current. The same source 28 is connected through an error detector circuit 30 and an amplifier 32 to the auxiliary stator windings through terminals 24 and 26.

The error amplifier 32 has input terminals 34 and 36 and output terminals 38 and 40. The output terminals 38 and 40 are connected respectively to auxiliary winding terminals 26 and 24.

The error detector 30 shown within the dotted lines includes a bridge circuit 42 having parallel potentiometers 44 and 46.

The potentiometer 44 has a variable contact 48 connected through a mechanical linkage to the pen 14 on the induction motor. The variable contact 48 is connected to the input terminal 34 of the amplifier 32.

The potentiometer 46 has a variable contact 50 electrically connected to the other input terminal 36 of the amplifier 32. The contact 50 varies with some measured value such as temperature, liquid level, humidity, speed, etc. Any voltage deveolped between input terminals 34 and 36 is an error signal which will be amplified and applied to the auxiliary winding terminals 24 and 26 to correct the movement of the pen 14. This correction will vary the contact 48 to return the system to balance so that no error signal occurs between terminals 34 and 36. It will be easily understood that any other type of standard servomechanism systems and/or circuits can be utilized in accordance with the principles of the present invention.

In FIGURE 2, there is shown the linear induction motor 12 discussed with respect to FIGURE 1 without the pen 14 and mechanical linkage 47 mounted thereon. The linear induction motor 12 includes a flexible armature conductor 16 joined at its free ends by the connector 18. The flexible armature 16 is a sheet of copper thin enough and flexible enough to pass around a pair of pulleys 52 and 54 mounted on standards 56 and 58 respectively. If the connector 18 is not needed, the flexible armature 16 may be an endless sheet of conducting material such as copper or any of the embodiments shown in FIGURES 4–10.

The flexible armature 16 passes around armature iron 60 mounted on suitable supports 62 and 64. The supports 62 and 64 are fixedly secured to the stator iron 66.

The stator iron 66 has mounted thereon auxiliary windings 70, 72, 74 and 76 in series circuit relation. The main winding of the linear induction motor consists of separate windings 78, 80, 82 and 84 alternately mounted between the auxiliary windings 72, 74, and 76. Each of the main and auxiliary windings is wound on a pole piece 86 in magnetic circuit contact with the stator iron 66. The pole piece 86 is secured to the stator iron 66 by suitable retainers 88 and 90 shown in FIGURE 3. The flexible armature 16 passes through the gap between the pole pieces 86 and the armature iron 60. It will be easily understood that the two phase windings set up a moving magnetic field along the length of the stator. This magnetic field induces currents in the flexible armature 16 by transformer action. The currents in the flexible armature 16 also create a magnetic field. The force on the flexible armature 16 will be maximum if the armature reactance equals the armature resistance. Such equality of reactance to resistance can be determined by design methods known in the art.

It will also be understood that it is not necessary that the linear motor 12 be a two phase motor. Rather, it can be any polyphase induction motor such as a three phase induction motor or a single phase induction motor with some auxiliary starting means. That is, it could be a split phase motor, a shaded pole or a capacitor start single phase motor.

All these induction motors operate on the same basic principles, i.e., the force achieved between the moving magnetic field of the stator and the induced magnetic field of the armature.

There are many types of endless belt flexible armatures which might be utilized in accordance with the principles of the present invention. Since the flexible armature normally has induced therein high currents and low voltages, there is little need for insulation between the armature 16 and the armature iron 60.

As an alternative to the copper conductive sheet 16 shown in FIGURES 1–3, the tape belt type armature 92 shown in FIGURES 4 and 4a might be utilized. That is, the tape belt type armature is formed of two coated Mylar tapes. One tape includes a Mylar base 94 with a copper coating thereon. The copper coating is etched to form two conducting strips 96 and 98 with conducting bars 100 therebetween. This latter type arrangement is best seen in FIGURE 4a. The second tape has a Mylar base 104 on which has been coated a layer of silicon iron particles. The iron particles are etched to form rectangles filling the gaps between the conducting bars 100. The two tapes are then placed together and heat-sealed.

It will be understood that any other type of electrically insulating flexible material other than Mylar might be utilized. Conducting materials such as silver might replace the copper shown in FIGURES 4 and 4a. The silicon iron particles are merely suggestive of a magnetic material which could be utilized to fill the gaps between the conducting bars.

The silicon iron 102 closes down the air gap between the stator and armature even more than was possible by making the tape armature extremely thin. The silicon particles 102 help concentrate the magnetic field between the conducting bars 100 so that they are cut more efficiently.

The flexible armature of the present invention might also be in the form 106 shown in FIGURE 5. The armature 106 would consist of conducting side links 108 and 110 adjoined by conducting pins 112 to form a chain.

As an alternative, as shown in FIGURE 6, the chain-type flexible armature 114 would not only have side links 116 and 118 joined by conducting bars 120, but would also have iron bars 122 inserted in the middle of the links 116 and 118 to concentrate the magnetic flux. The chains 106 and 114 would roll over suitable rollers rather than sprockets.

In FIGURE 8, there is shown a still further embodiment of the present invention generally designated by the numeral 124. This is a ladder-type chain made of O-shaped conductive rings 126 joined by flexible conducting strips 130.

In FIGURE 9, there is shown another ladder-type flexible armature 132 formed of flexible conducting cords 134 and 136 joined by rigid cross members 138. The flexible conducting cords 134 and 136 can be stranded copper wire to which is crimped, welded or soldered a stiff conducting wire or bar 138. It can easily be seen that iron cross members such as are shown in FIGURES 4, 6 and 7 could be interspersed between the conducting cross members to help concentrate the magnetic field between the conductnig members. Also, the ladder-type arrangement shown in FIGURES 8 and 9 could be forged or rolled out of one piece of material rather than the many pieces shown in the figures.

In FIGURE 10, there is shown a woven belt-type flexible armature 140 utilizing the principles of the present invention. The belt 140 is woven using fine conducting wires on opposite sides 142 and 144 of the belt 140. The warp on the sides 142 and 144 is formed of conducting wires. The center part of the warp 146 is formed with conducting or nonconducting threads. The threads 148 forming the woof will be conducting wires. This results in a flexible belt with cross conducting members shorted at each end by longitudinal conducting members. If desired, iron wire could be woven interspersed with the conducting woof 148 to concentrate the magnetic field between the conducting woof.

It should be understood that the linear induction motor of the present invention is not limited to a reversible motor such as is shown in FIGURES 1–3, but could be a continuously running motor having an endless belt. Also, it is possible to have the stator coils above and below the tape armature rather than just having the armature iron above the tape and the stator coils below the tape.

It is also within the contemplation of the present invention to provide a linear motor in which the armature iron would replace the pulleys, and the stator windings would be located opposite the armature iron with the belt passing therebetween. The actual armature and stator would then no longer be in a straight line. Rather, the armature iron would be cylindrical as are the pulleys it replaces, and the stator pole pieces would be shaped to conform to a portion of the armature iron surface.

The present invention may be embodied in other specific forms without departing from the spirit or essential attributes thereof and, accordingly, reference should be made to the appended claims, rather than to the foregoing specification as indicating the scope of the invention.

I claim:

1. An induction motor comprising stator pole pieces having windings associated therewith, armature iron spaced from said pole pieces to define a gap therebetween, a flexible electrically conducting armature in the form of an endless belt movably mounted within said gap for relative motion with respect to said stator pole pieces and said armature iron, said flexible armature comprising conducting side members joined by parallel conducting cross members, magnetic material between adjacent conducting cross members to increase the flux linkage of said flexible armature with the stator and armature iron magnetic circuits, and terminal means for connecting said stator windings to a source of alternating current.

2. The induction motor of claim 1 wherein said windings are connected up in multiphase relation, control means connected to said terminal means for controlling the supply of alternating current to said multiphase windings, and mechanical connector means adapted to be responsive to the movement of said flexible armature.

3. The induction motor of claim 1 wherein said flexible armature is a chain formed of conducting side links and conducting cross links.

4. The flexible armature of claim 3 wherein cross links of magnetic material are connected between conducting side links in the space between conducting cross links.

5. An induction motor comprising stator pole pieces having windings associated therewith, armature iron spaced from said pole pieces to define a gap therebetween, a flexible electrically conducting armature in the form of an endless chain movably mounted within said gap for relative motion with respect to said stator pole pieces and said armature iron, said flexible armature being formed of conducting side links joined by conducting cross links, said cross links being rigid, and terminal means for connecting said stator windings to a source of alternating current.

6. The induction motor of claim 5 wherein said flexible armature is formed of conducting rigid rings connected by flexible conducting materials one to another in a ladder-type arrangement.

7. The induction motor of claim 1 wherein said flexible armature is a woven belt, said woven belt having a woof formed of fine conducting wires, the warp on each side of said belt being formed of conducting wires, and wire made of magnetic material interspersed with the conducting woof.

References Cited by the Examiner

UNITED STATES PATENTS

| | | | |
|---|---|---|---|
| 2,337,430 | 12/1943 | Trombetta | 310—13 |
| 2,846,641 | 8/1958 | Basham | 346—32 |
| 2,931,963 | 4/1960 | Wilson | 346—32 |
| 3,109,113 | 10/1963 | Henry-Baudot | 310—13 |
| 3,144,570 | 8/1964 | Crowley | 310—13 |
| 3,259,768 | 7/1966 | Burr | 310—13 |

RICHARD B. WILKINSON, *Primary Examiner.*

J. G. MURRAY, H. B. KATZ, *Assistant Examiners.*